UNITED STATES PATENT OFFICE.

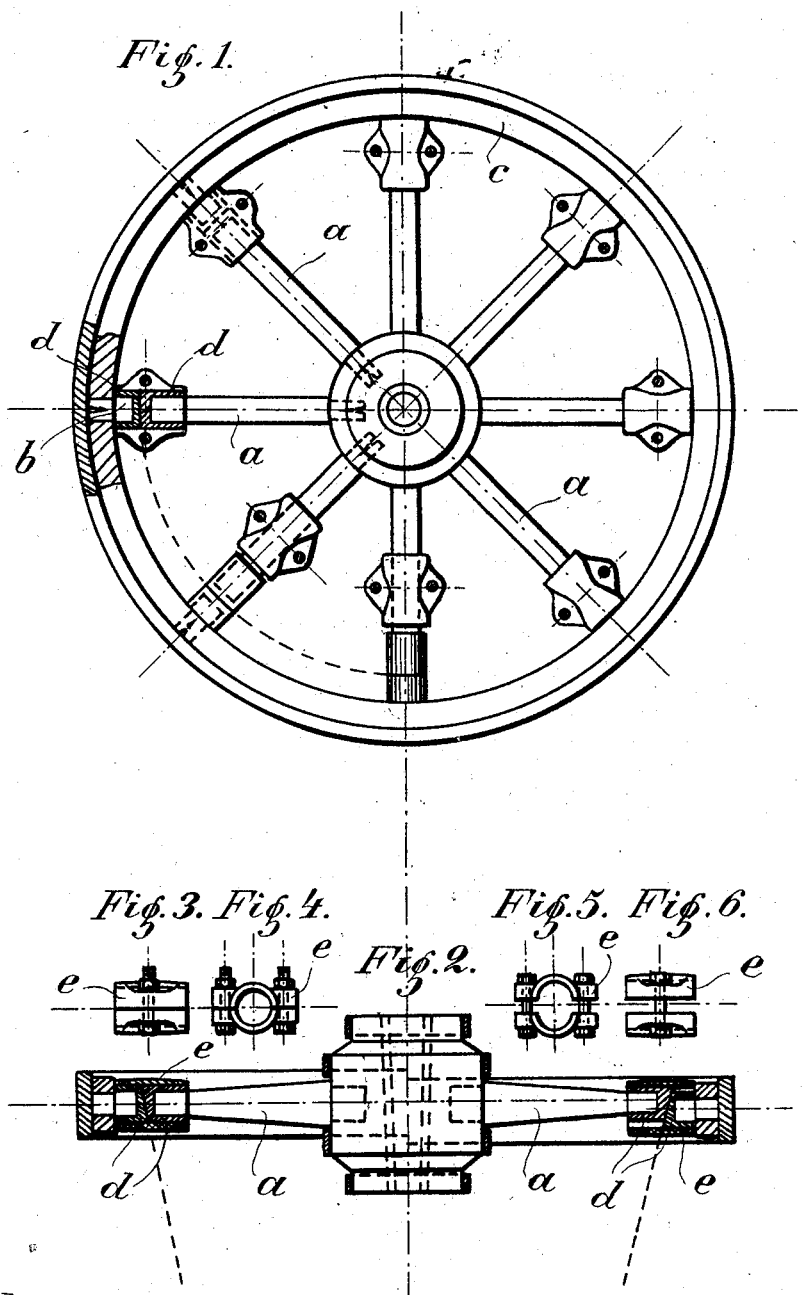

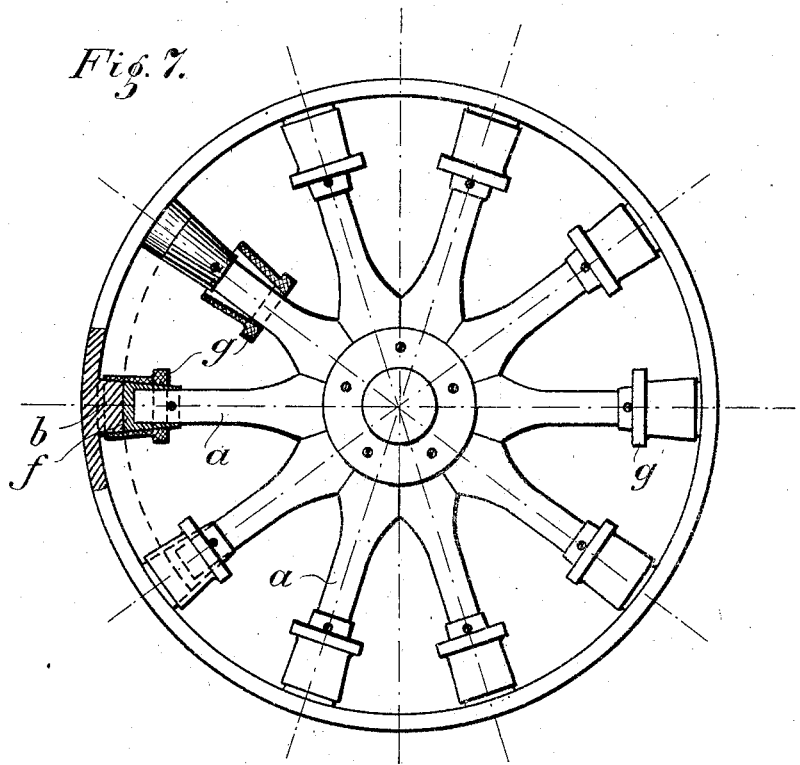
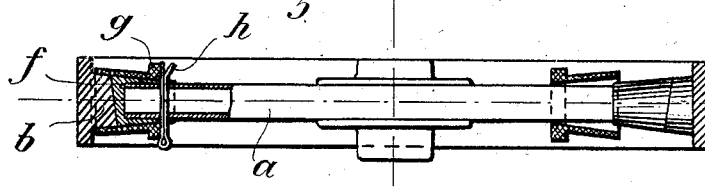
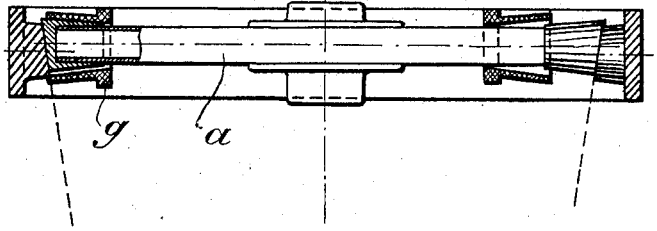

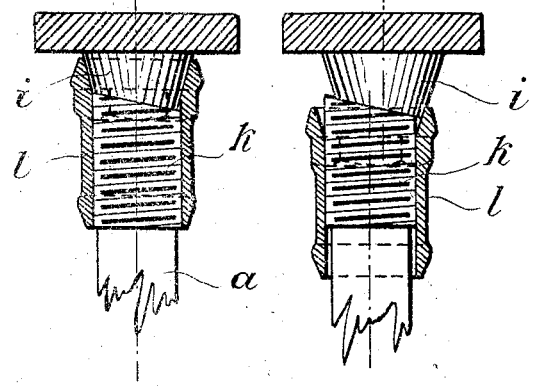
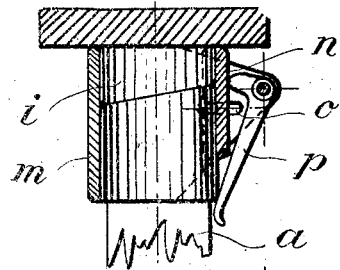
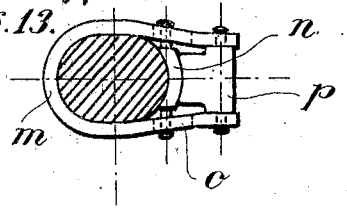

CARL PÜTZ, OF SOLINGEN, GERMANY, ASSIGNOR TO TH. KIESERLING, OF SOLINGEN, GERMANY.

VEHICLE-WHEEL.

1,056,055.

Specification of Letters Patent.   Patented Mar. 18, 1913.

Application filed June 1, 1910.   Serial No. 564,400.

*To all whom it may concern:*

Be it known that I, CARL PÜTZ, a citizen of Germany, and residing at Solingen, Germany, have invented new and useful Improvements in Vehicle-Wheels, of which the following is a specification.

This invention relates to a vehicle wheel of novel construction with exchangeable rim, in which a ready assemblage of the spokes and rim may be effected in such a manner that the parts become firmly united and blocked and that an accidental disengagement of the parts is prevented in a reliable manner.

In the accompanying drawings: Figure 1 is a side elevation partly in section of a vehicle wheel embodying my invention; Fig. 2 an end view partly in section thereof; Fig. 3 a side view of the coupling showing it closed; Fig. 4 an end view thereof; Fig. 5 a side view of the coupling, showing it open; Fig. 6 an end view of Fig. 5; Fig. 7 a sectional face view of another vehicle wheel embodying the invention with the spoke and rim tightened; Fig. 8 a horizontal central cross section partly in plan of Fig. 7, showing spokes and rim firmly united; Fig. 9 a similar view showing the parts before being tightened; Fig. 10 a cross section through the spoke of another vehicle wheel, embodying the invention, with the spoke and rim tightened; Fig. 11 a similar section showing the parts before being tightened; Fig. 12 a cross section through the spoke of another vehicle wheel, embodying the invention, and Fig. 13 a plan of the coupling.

Opposite spokes $a$, the wheel rim $c$ is provided with similarly shaped studs $b$ extending inwardly from said rim. If the spokes and studs are formed from wood or tubing, the outer spoke ends as well as the studs are fitted with caps to prevent any damage to said parts while assembling or dismantling the same. The outer ends of the spokes and the inner faces of the studs have beveled wearing faces which all lie in the surface of a cone, the axis of which coincides with the wheel axis, said wearing surfaces being indicated by dotted lines in Figs. 1 and 9.

The ends of spokes $a$ and studs $b$, (or their caps, when the latter are employed) are embraced by suitable couplings $e$, the latter being adapted to unite both parts into a solid wheel structure, wedging the wheel center into the rim. The couplings $e$ are movable along the spokes, so that they may be readily moved away from the wearing faces of the parts $a$, $b$, when the coupling is slightly loosened. When the couplings are advanced to encompass the joints, the latter will be effectively protected from dirt. When the couplings are retracted from the joints they will be carried upon the spokes, so that they are not liable to become lost. After the retraction of the couplings the wheel rim may be readily removed, and a new rim may be fitted in position.

The wheel center is so fitted into rim $c$, that each spoke $a$ is alined with a stud $b$. During assemblage, the parts will have the position indicated on the right side of Figs. 2 and 9 and in Fig. 11. After moving the couplings $e$ over the studs $b$, and tightening them up, the wheel center will be driven into rim $c$, so that the coöperating spokes and studs will become axially alined, as indicated on the left side of Figs. 2 and 8, and in Fig. 10. In this way, the wheel center will be firmly wedged into the rim, so that a solid wheel structure will be obtained.

As in use, the ends of spokes $a$, and studs $b$, contact with each other, the couplings $e$ are relieved from direct vertical pressure of the wheel, and during the rotation of the latter they are freely subjected to centrifugal action, so that they are forced against the rim and blocked in position. If the spoke ends and the studs, or the studs alone are made coniform, the centrifugal force besides securing the couplings in position, also tightens up their connections, so that the stability of the wheel is increased with an increase in speed.

If the ends of the spokes are made cylindrical or prismatic, the couplings may be made in two parts (Figs. 4–6) which are connected by means of screws. During the rotation of the wheel, the centrifugal force will press the couplings radially against the rim, so that they become arrested. By slacking the screws, the couplings may be withdrawn, so that a new rim may be applied. If the ends of the spokes and the studs are made conical, the inner faces of the couplings should be made correspondingly conical, and each of the couplings may be made in a single piece (Figs. 7–9), the couplings being, during assemblage, driven home by a hammer or in similar manner. The same effect is obtained if the studs only are made conical, while the spoke ends are made cylindrical or prismatic. During action, the couplings are here also arrested in position by centrifugal force which drives them against the felly. If the ends of the spokes are threaded, while the studs are coniform, the inner faces of the couplings are correspondingly partly threaded and partly coniform (Figs. 10 and 11). The coupling may be readily moved by a wrench.

While screwing on the coupling, the rim is pressed laterally against the spoke end, the thread of the spoke not being designed to impart a tension to the rim, but merely to wedge the rim sidewise tightly against the spoke for which reason a multiple thread of high pitch may be used. The coupling will have become seated as soon as it abuts against the rim. During action, the centrifugal force will press the couplings against the rim, as they are relieved from direct vertical wheel pressure, so that they will become arrested. In assembling the parts, the screwing of the couplings over the studs will cause the rim to become automatically centered in a radial and an axial direction and to become firmly united to the wheel center.

If the spoke ends and the studs are made cylindrical or prismatic, the couplings may be composed of several parts (Figs. 12 and 13). In order to secure the coupling in position, it is provided with an elbow lever $p$ which when swung up as shown in Fig. 12, is effectively arrested.

I claim:

1. In a vehicle wheel, a rim having beveled studs, spokes having beveled ends engaging the studs, the bevels of the studs and spoke-ends lying in the surface of a cone, the axis of which coincides with the wheel axis, and couplings adapted to drive together both parts of the wheel and to couple the spoke-ends with the studs, said couplings being slidable along the spokes, relieved from direct vertical pressure of the wheel and so subjected by rotation to the free action of centrifugal force that the latter insures a secure connection of the coupled parts.

2. In a vehicle wheel, a rim having beveled studs, spokes having beveled ends engaging the studs, the studs being coniform and the spoke-ends being threaded, couplings having correspondingly beveled and threaded inner faces the couplings being movable upon the spokes relieved from direct vertical pressure of the wheel and subjected during rotation to the free action of centrifugal force to insure a secure connection.

CARL PÜTZ. [L. S.]

Witnesses:
 OTTO KÖNIG,
 WALTER VONNEGUT.